United States Patent [19]

Carmon et al.

[11] Patent Number: 4,974,651
[45] Date of Patent: Dec. 4, 1990

[54] PORTABLE WORKBENCH

[76] Inventors: Jimmy W. Carmon, 11355 Holmes Rd. East, Collierville, Tenn. 38017; Charles F. Manscoe, 1035 Wellsville, Memphis, Tenn. 38117

[21] Appl. No.: 456,466

[22] Filed: Dec. 26, 1989

Related U.S. Application Data

[63] Continuation-in-part of Ser. No. 316,422, Feb. 27, 1989, abandoned.

[51] Int. Cl.⁵ .......................... B27C 9/00; B25H 1/16
[52] U.S. Cl. .................... 144/286 R; 83/471; 83/859; 144/287
[58] Field of Search ............ 83/471, 574, 859; 144/1 R, 286 R, 286 A, 287

[56] References Cited

U.S. PATENT DOCUMENTS

| | | | |
|---|---|---|---|
| 4,335,765 | 6/1982 | Murphy | 144/286 R |
| 4,753,279 | 6/1988 | Harris | 144/287 |
| 4,860,807 | 8/1989 | Vacchiano | 144/286 R |
| 4,874,025 | 10/1989 | Cleveland | 144/287 |

*Primary Examiner*—W. Donald Bray
*Attorney, Agent, or Firm*—Walker & McKenzie

[57] ABSTRACT

A portable workbench for supporting a power tool above a support surface. The workbench includes a support member; first auxiliary support structure for supporting the first end of the workpiece above the top surface of the support member; the first auxiliary support structure being movable between a first position adjacent the first end of the support member and a second position spaced outwardly from the first end of the support member; second auxiliary support structure for supporting the second end of the workpiece above the top surface of the support member; the second auxiliary support structure being movable between a first position adjacent the second end of the support member and a second position spaced outwardly from the second end of the support member; guide structure for guiding the first and second auxiliary support structure between the first and second positions; and securing structure for securing the power tool to the support member, the securing structure being adjustable relative to the top surface of the support member for allowing the location of the power tool between the first and second ends of the top surface to be adjusted.

18 Claims, 4 Drawing Sheets

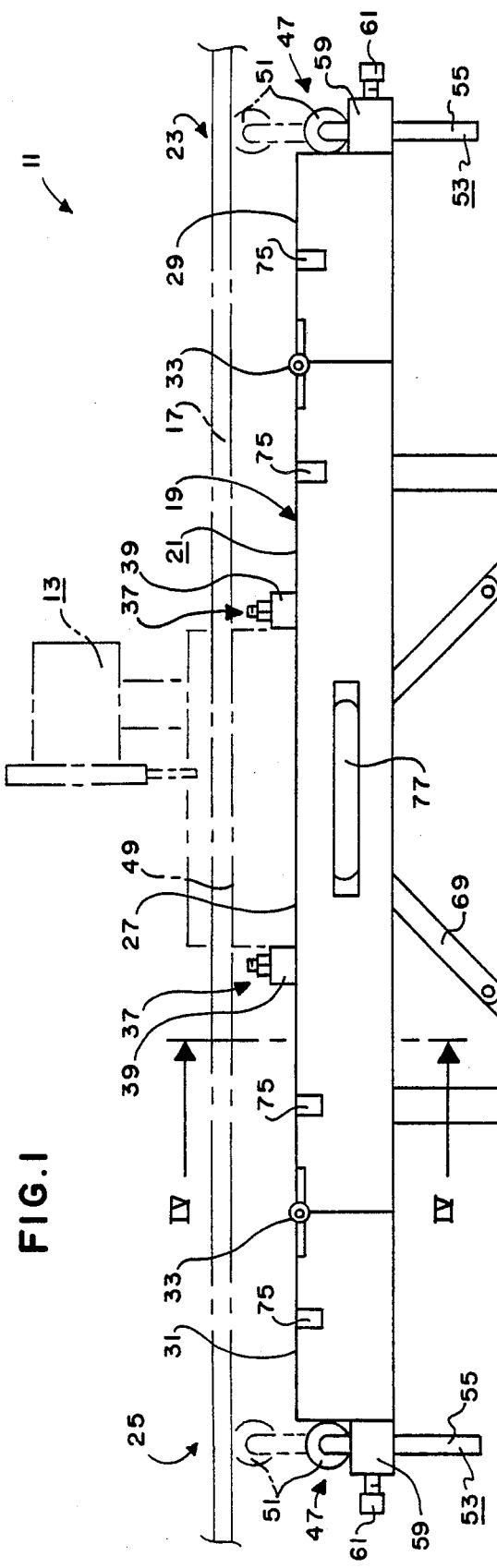
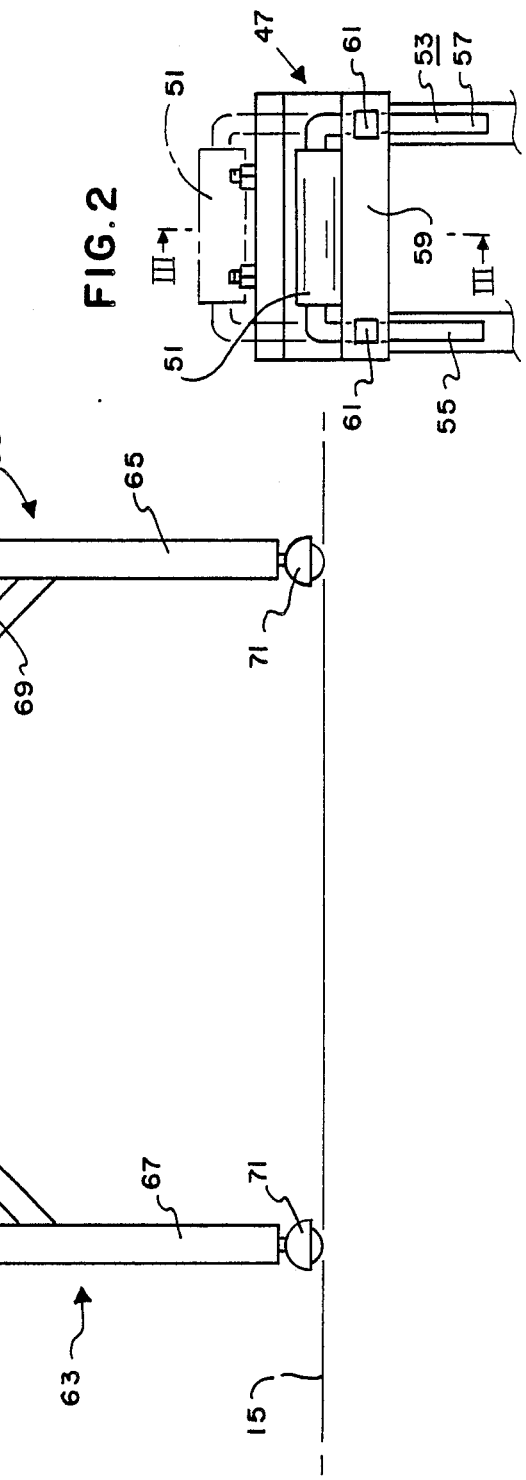

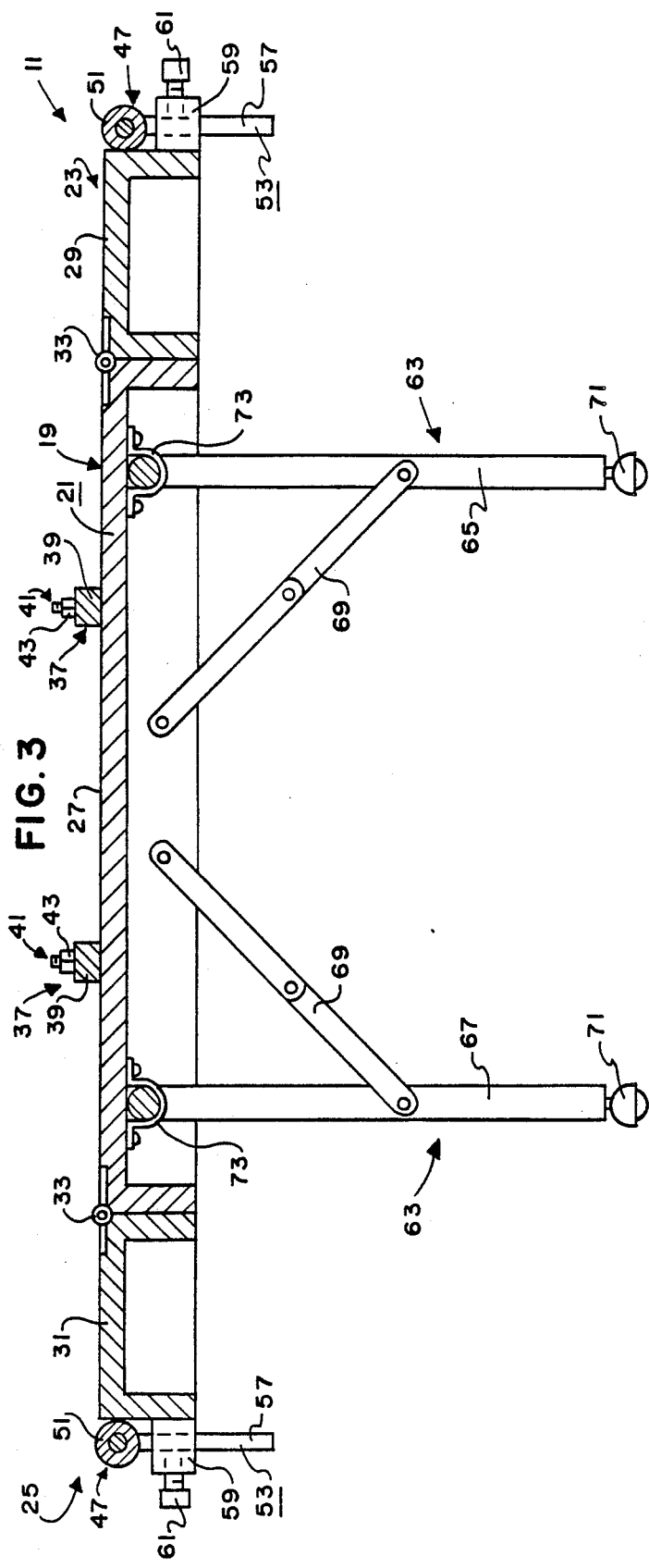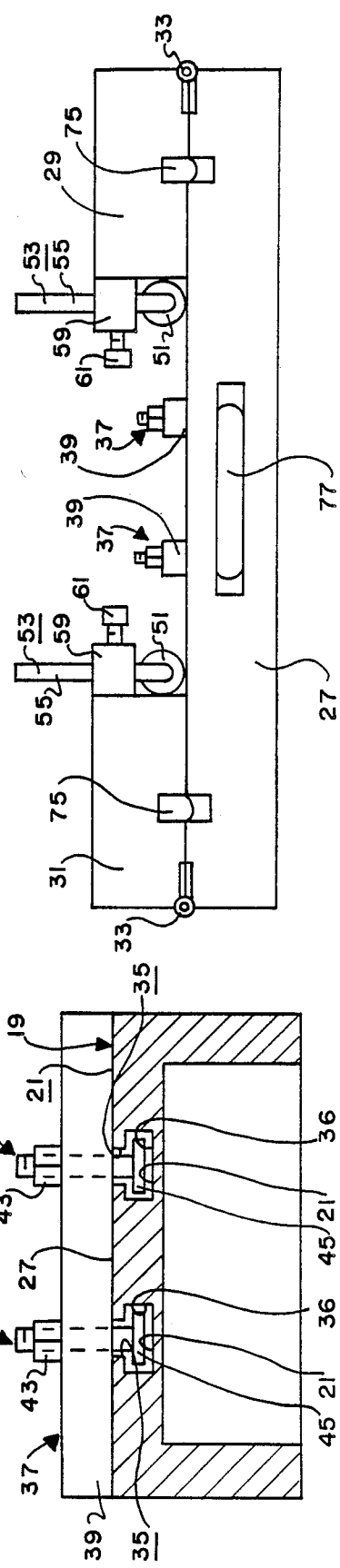

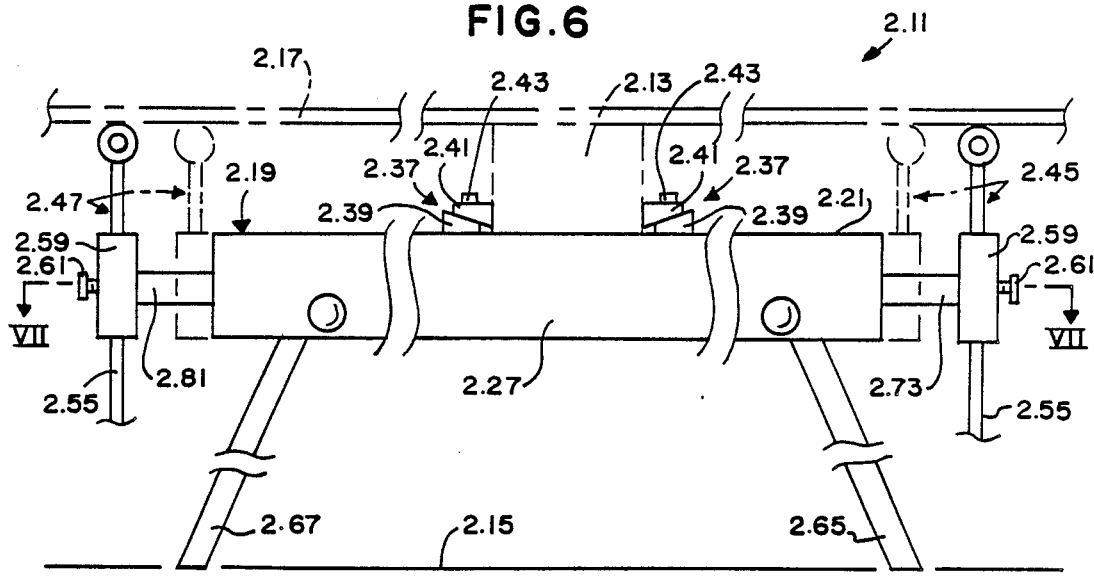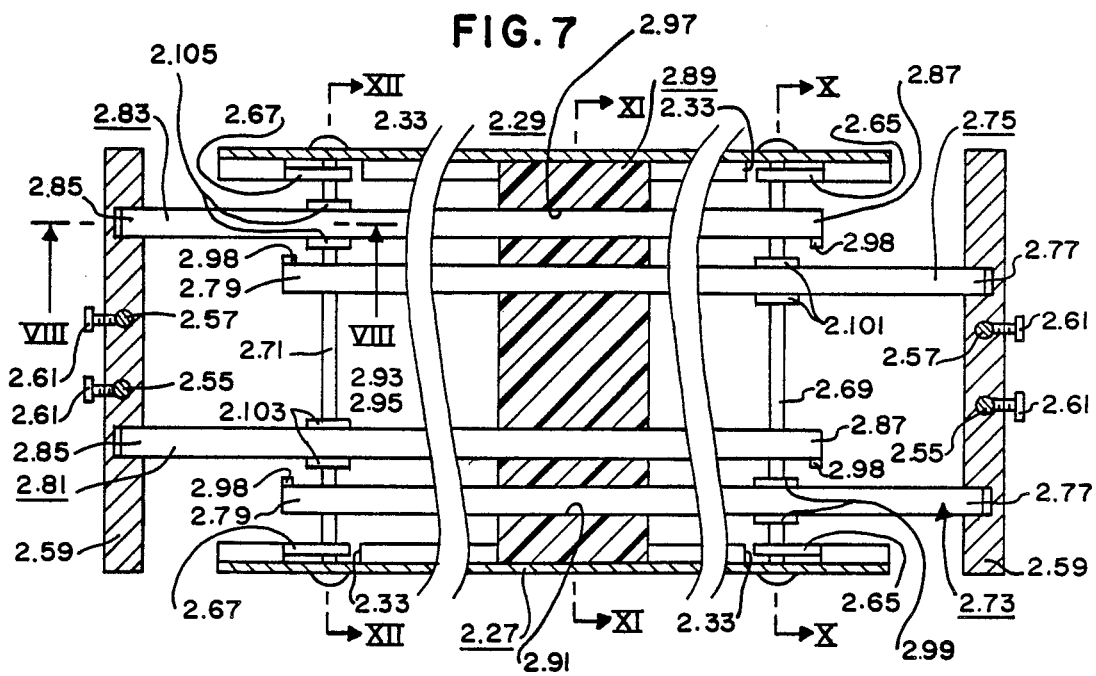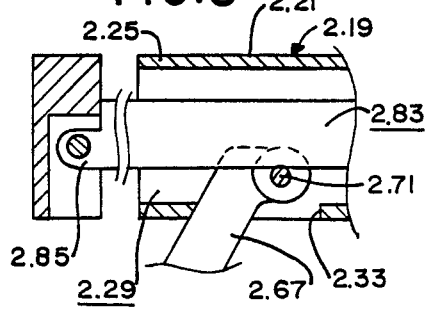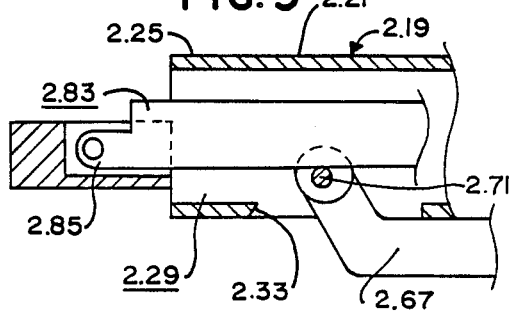

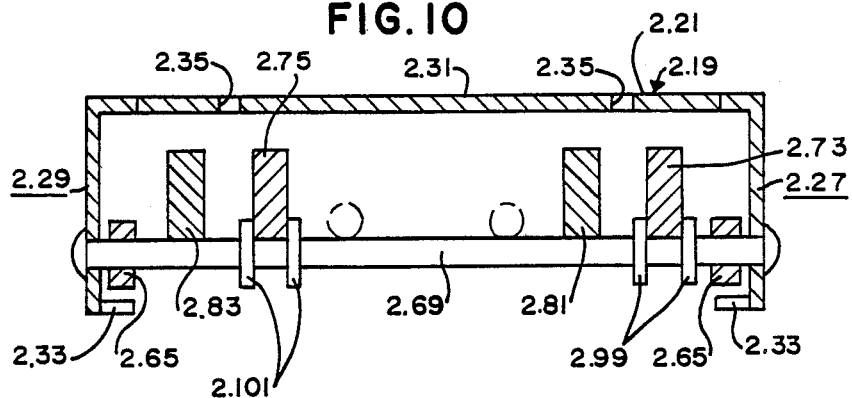
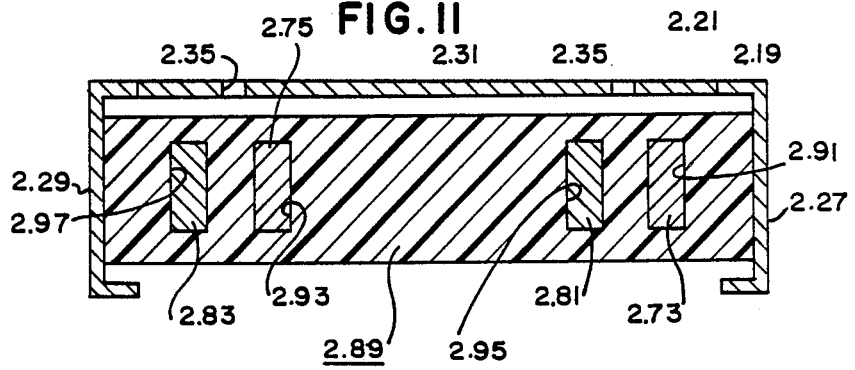
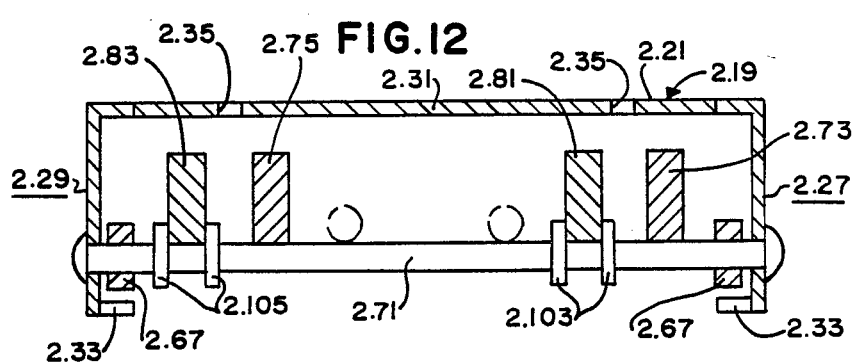
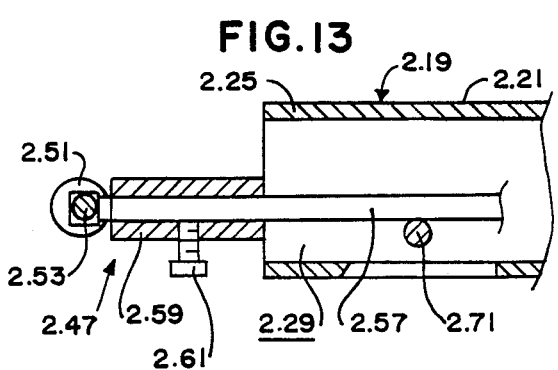
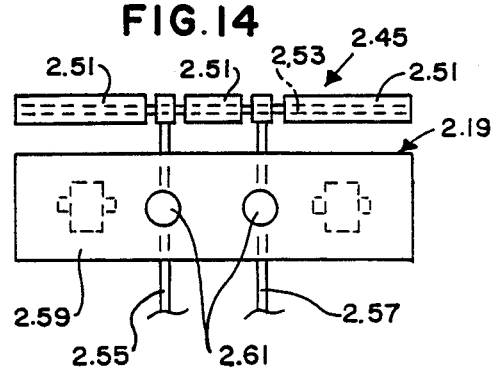

PORTABLE WORKBENCH

CROSS-REFERENCE TO RELATED APPLICATION

This application is a continuation-in-part of our pending application, Serial No. 07/316,422, filed Feb. 27, 1989, entitled "Portable Workbench", now abandoned.

BACKGROUND OF THE INVENTION

1. Field of the Invention:

The present invention relates, in general, to portable workbenches for portable table-top power tools and the like.

2. Information Disclosure Statement:

A preliminary patentability search in class 269, subclasses 902 and 901, class 108, subclass 36, and class 144, subclasses 287 and 286 produced the following patents which may be relevant to the present invention: Howe, U.S. Pat. No. 2,326,461 which relates to folding support structures such as tables, chairs, ironing boards and the like; Bieszki, U.S. Pat. No. 2,433,315 which discloses a foldable table that is in the form of a suitcase when in a folded position; Miller, U.S. Pat. No. 2,682,899 which discloses a carpenter's workbench having a plurality of slots in the top thereof for allowing a saw blade to pass through the plane of the bench top; Brenta, U.S. Pat. No. 4,105,055 which discloses a portable kit that can be set up so as to operate either as a circular saw, a table saw, a jig saw or a wood shaper; Oltman et al., U.S. Pat. No. 4,239,195 which discloses a workbench including collapsible legs, tool holders attachable to the legs, extensible auxiliary support legs, a generally planar bench top with a removable section for power tools, and a pair of adjustable vices cooperative with the planar top; Hickman et al., U.S. Pat. 4,256,294 which discloses a combined portable workbench and a carrying case for the workbench that facilitates use of the workbench; Gillotti, US Pat. No. 4,333,638 which discloses a portable massage and therapeutic body worktable; Corazza, U.S. Pat. 4,501,202 which discloses a worktable for use in automobile body shops; Parker, U.S. Pat. No. 4,703,830 which discloses a collapsible, self-storing saw buck; and Bassett, U.S. Pat. 4,726,405 which discloses an extension table assembly for a table saw. In addition, the following patents were cited in the prosecution of application, Serial No. 07/316,422 and may also be relevant to the present invention: Simonson, U.S. Pat. No. 3,931,751 which discloses a collapsible mounting for power saw units; Chappell, U.S. Pat. 4,079,648 which discloses a miter attachment for use with portable electric circular saws; Wolff, U.S. Pat. No. 4,733,704 which discloses a workbench; Murphy, U.S. Pat. No. 4,335,765 which discloses a one-man portable multi-purpose construction table; and Mericle, U.S. Pat. No. 4,292,870 which discloses a guide plate for wood working tools. None of the above patents disclose or suggest the present invention. More specifically, none of the above patents disclose the combination of a support member; first auxiliary support means for supporting the first end of the workpiece above the top surface of the support member; the first auxiliary support means being movable between a first position adjacent the first end of the support member and a second position spaced outwardly from the first end of the support member; second auxiliary support means for supporting the second end of the workpiece above the top surface of the support member; the second auxiliary support means being movable between a first position adjacent the second end of the support member and a second position spaced outwardly from the second end of the support member; guide means for guiding the first and second auxiliary support means between the first and second positions; and securing means for securing the power tool to the support member, the securing means being adjustable relative to the top surface of the support member for allowing the location of the power tool between the first and second ends of the top surface to be adjusted.

SUMMARY OF THE INVENTION

The present invention is directed toward providing an improved workbench for portable table-top power tools and the like. Many such power tools are used in finish carpentry work. For example, a finish carpenter may use portable table saws, band saws, miter saws and the like during the finish carpentry work on a single house. One problem with such portable power tools when used by finish carpenters and the like is providing proper support for the tool while the tool is being used. This is especially true for finish carpenters who normally work at unfinished building sites where workbenches and the like are not commonly available This typically results with the carpenter either supporting the power tools on the ground or balancing the power tools on saw horses or on sheets of wood that are in turn balanced on saw horses. In either case, the tools are too low and/or too insecure for efficient, safe use. The present invention overcomes these problems The workbench of the present invention includes a support member; first auxiliary support means for supporting the first end of the workpiece above the top surface of the support member; the first auxiliary support means being movable between a first position adjacent the first end of the support member and a second position spaced outwardly from the first end of the support member; second auxiliary support means for supporting the second end of the workpiece above the top surface of the support member; the second auxiliary support means being movable between a first position adjacent the second end of the support member and a second position spaced outwardly from the second end of the support member; guide means for guiding the first and second auxiliary support means between the first and second positions; and securing means for securing the power tool to the support member, the securing means being adjustable relative to the top surface of the support member for allowing the location of the power tool between the first and second ends of the top surface to be adjusted.

BRIEF DESCRIPTION OF THE DRAWINGS

FIG. 1 is a front elevation view of a first embodiment of the portable workbench of the present invention shown in an open position with a power miter saw and a workpiece shown in broken lines.

FIG. 2 is a side elevation view of a portion of FIG. 1.

FIG. 3 is a sectional view substantially as taken on line II—II of FIG. 2.

FIG. 4 is an enlarged sectional view substantially as taken on line III—III of FIG. 1 with portions thereof omitted for clarity.

FIG. 5 is a front elevation view of the first embodiment of the portable workbench of the present invention shown in a folded position.

FIG. 6 is a front elevation view of a second embodiment of the portable workbench of the present invention shown in an open position with a power tool and a workpiece shown in broken lines.

FIG. 7 is a sectional view substantially as taken on line VII—VII of FIG. 6.

FIG. 8 is an enlarged sectional view substantially as taken on line VIII—VIII of FIG. 7.

FIG. 9 is a sectional view substantially similar to FIG. 8 but with certain portions thereof shown in moved positions.

FIG. 10 is an enlarged sectional view substantially as taken on line X—X of FIG. 7.

FIG. 11 is an enlarged sectional view substantially as taken on line XI—XI of FIG. 7.

FIG. 12 is an enlarged sectional view substantially as taken on line XII—XII of FIG. 7.

FIG. 13 is a sectional view similar to FIG. 9 but showing certain other elements.

FIG. 14 is an end elevational view of a portion of FIG. 6.

DESCRIPTION OF THE PREFERRED EMBODIMENT

The portable workbench 11 of the present invention is for supporting a power tool 13 above a support surface 15 as the power tool 13 performs a power operation on a workpiece 17. The power tool 13 may be any one of a number of different type power tools such as a portable power miter saw or the like, used by professional carpenters and the like and which are intended to be supported on a table or other work surface. Such portable power tools are well known to those skilled in the art. The support surface 15 may be the floor of an unfinished building, the ground or the like. The workpiece 17 may be an elongated length of lumber or the like, depending on the specific power tool used as will now be apparent to those skilled in the art.

The workbench 11 includes a support member 19 for supporting the power tool 13. The support member 19 includes a top surface 21 having a first end 23 and a second end 25. The support member 19 preferably includes a midportion 27, a first end portion 29 hingedly attached to one end of the midportion 27, and a second end portion 31 hingedly attached to the other end of the midportion 27. More specifically, the midportion 27 and end portions 29, 31 may be constructed as three separate parts joined together by typical hinge members 33 or the like as clearly shown in FIGS. 1, 3 and 5 to allow the portable workbench Il to be folded into a compact, easily transported unit as shown in FIG. 5 and in a manner as will now be apparent to those skilled in the art. The support member 19 may be constructed in various manners out of various materials. For example, the midportion 21 and each end portion 29, 31 may be cast out of aluminum or the like as will now be apparent to those skilled in the art. The top surface 21 of the support member 19 preferably has one or more elongated grooves 35 therein (see FIG. 4) for reasons which will become apparent More specifically, the midportion 21 is preferably provided with a spaced apart pair of parallel grooves 35 with each groove 35 having an inverted "T" cross sectional shape forming an enlarged lower portion 36 as clearly shown in FIG. 4. The specific size of the support surface 15 may vary. In the preferred embodiment, the support surface 15 may have an unfolded, in-use length (see FIGS. 1 and 3) of approximately six feet, a folded, stored length (see FIG. 5) of approximately four feet, and a width (see FIGS. 2 and 4) of approximately one foot.

The portable workbench 11 includes securing means 37 for securing the power tool 13 to the support member 19. The securing means 37 is adjustable relative to the top surface 21 of the support member 19 for allowing the location of the power tool 13 between the first and second ends 23, 25 of the top surface 21 to be adjusted. The securing means 37 preferably includes a body member 39 for abutting each side of the base of the power tool 13 as clearly shown in FIG. 1. Thus, the securing means 37 preferably includes a pair of body members 39. Each body member 39 may have a plurality of teeth-like projections (not shown) on the sides thereof for securely gripping the base of the power tool 13 as will now be apparent to those skilled in the art. Each body member 39 may be constructed in various manners and out of various material as will now be apparent to those skilled in the art such as, for example, by being cast out of aluminum or the like.

The portable workbench 11 preferably includes attachment means 41 slidably positioned within the grooves 35 in the top surface 21 of the support member 19 for slidably attaching the securing means 37 to the support member 19. The attachment means 41 preferably includes bolt means 43 with the head 45 of each bolt means 43 slidably positioned within the enlarged lower portion 36 of one of the grooves 35, with the body of each bolt means 43 extending through an aperture in a body member 39, and with the nut portion of each bolt means 43 clamping the body member 39 to the top surface 21 as clearly shown in FIG. 4. The bolt means 43 will thus slidably secure each of the body members 39 to the top surface 21 of the support member 19 as will now be apparent to those skilled in the art.

The portable workbench 11 preferably includes auxiliary support members 47 for supporting opposite ends of the workpiece 17 above the top surface 21 of the support member 19 as clearly shown in FIG. 1. The auxiliary support members 47 are preferably vertically adjustable to allow the distance the workpiece 17 is supported above the top surface 21 to be varied. Thus, the workpiece 17 is normally supported above the top surface 21 a distance equal to the distance a work support platform 49 of the power tool 13 is positioned above the top surface 21 when the power tool 13 is secured to the support member 19 and the height of the work support platform 13 of different power tools 13 may vary as will now be apparent to those skilled in the art. Each of the auxiliary support members 47 preferably includes a roller member 51 for rollably supporting the workpiece 17 and a frame member 53 for connecting the roller member 51 to the support member 19. The frame member 53 preferably includes first and second arm portions 55, 57 for slidably extending through lug members 59 on the opposite ends of the support member 19 to thereby slidably mount the roller members 51 to the opposite ends of the support member 19 as will now be apparent to those skilled in the art. Bolts 61 are preferably provided for screwing through the lug members 59 and against the arm portions 55, 57 to secure the arm portions 55, 57 to the support member 19 and thereby fix the height of the roller members 51 relative to the top surface 21 as will now be apparent to those skilled in the art. The frame members 53 may be cast or machined out of metal and the roller members 51 may have a plastic or rubber outer cover so as not to mar the workpiece 17 and may be rotatably mounted to the frame members 53 by bearings or the like. Indicia (not shown) may be provided on the arm portions 55, 57 for making it easier to set the height of the roller members 51. The indicia may be in inches so it will only be necessary to measure the distance between the top surface 21 and the top of the work support platform 49 and then set the roller members 51 to that distance as will now be apparent to those skilled in the art. The lug members 59 may be cast out of aluminum or the like as integral, one piece units with the end portions 29, 31 of the support member 19. It should be noted that the auxiliary support means 47 may be completely removed from the lug members 59 when not needed and the workbench 11 may include vice means (not shown) or the like adapted to be secured to the lug members 59 as will now be apparent to those skilled in the art.

The portable workbench 11 preferably includes leg means 63 attached to the support member 19 for holding the support member 19 above the support surface 15. The leg means 63 are preferably foldable to allow the workbench 11 to be easily moved. The leg means 63 preferably includes a first leg set 65 pivotally mounted to the underside of the support member 19 substantially adjacent to the first end 23 thereof and a second leg set 67 pivotally mounted to the underside of the support member 19 substantially adjacent to the second end 25 thereof as clearly shown in FIG. 3. Brace members 69 are preferably provided to help hold the leg sets 65, 67 steady in an open position as shown in FIGS. 1 and 3. Typical casters 71 or the like may be mounted on the ends of each leg set 65, 67 to allow the workbench to be easily rolled on the support surface 15. The leg means 63 may be constructed out of metal in any manner now apparent to those skilled in the art and pivotally attached to the underside of the support member 19 by straps 73 or the like (see FIG. 3).

As thus constructed, the workbench 11 may be easily folded to an easily carried and easily stored position as shown in FIG. 5. The workbench 11 is preferably provided with latches 75 for holding the workbench 11 in the folded position and with a handle 77 for allowing the workbench 11 to be easily carried in the folded position It should be noted that the auxiliary support means 47 may be removed from the lug members 59 and attached to the support member 19 in an out-of-the-way location by springs, snaps or the like to make the workbench 11 more compact, etc., when in the folded position.

A second preferred embodiment of the portable workbench of the present invention is shown in FIGS. 6—14 and identified by the numeral 2.11. The portable workbench 2.11 is used to support a power tool 2.13 above a support surface 2.15 as the power tool 2 15 performs a power operation on a workpiece 2.17. The workpiece 2.17 may consist of an elongated length of lumber or the like having a first end and a second end.

The workbench 2.11 includes a support member 2.19 for supporting the power tool 2.13. The support member 2.19 includes a top surface 2.21 having a first end 2.23 and a second end 2.25. The support member 2.19 may consist of a tabletop-like structure with a pair of C-shaped side rails 2.27, 2.29 and a flat plate 2.31 extending between the top edges of the side rails 2.27, 2.29 and forming the top surface 2.21 of the support member 2 19. Cut-outs 2.33 are preferably provided in the bottom flange of each C-shaped side rail 2.27, 2.29 adjacent both ends thereof as shown in FIGS. 7, 8 and 9 for reasons which will hereinafter become apparent. Longitudinal grooves 2.35 are preferably provided in the top surface 2.21 for reasons which will hereinafter become apparent The side rails 2.27, 2.29 and plate 2.31 may be constructed in various manners, sizes and shapes and out of various materials as will now be apparent to those skilled in the art. For example, the side rails 2.27, 2.29 and plate 2.31 may be constructed out of aluminum and secured together by screws or the like to provide a rectangular top surface of, for example, approximately 14 inches wide and 72 inches long.

The portable workbench 2.11 includes securing means 2.37 for securing the power tool 2.13 to the support member 2.19. The securing means 2.37 is adjustable relative to the top surface 2.21 of the support member 2.19 for allowing the location of the power tool 2.13 between the first and second ends 2.23, 2.25 of the top surface 2.21 to be adjusted. The portable workbench 2.11 preferably includes a plurality of the securing means 2.37 for being positioned on opposite sides of the power tool 2.13 as will now be apparent to those skilled in the art. Each securing means 2.37 preferably includes a lower wedge member 2.39, an upper wedge member 2.41, and bolt means 2.43 for securing the wedge members 2.39, 2.41 to one another and to the support member 2.19. The bolt means 2.43 are preferably slidably mounted in the grooves 2.35 in the top surface 2.21 and the wedge members 2 39, 2.41 will coact to tightly wedge the power tool 2.13 between coacting securing means 2.37 as will now be apparent to those skilled in the art.

The portable workbench 2.11 includes a first auxiliary support means 2.45 for supporting the first end of the workpiece 2.17 aboVe the top surface 2.21 of the support member 2.19. The first auxiliary support means 2.45 is movable between an inner or first position adjacent the first end 2.23 of the support member 2.19 as shown in broken lines in FIG. 6 and an outer or second position spaced outwardly from the first end 2.23 of the support member 2.19 as shown in solid lines in FIG. 6. The portable workbench 2.11 includes a second auxiliary support means 2.47 for supporting the second end of the workpiece 2.17 above the top surface 2.21 of the support member 2.19. The second auxiliary support means 2.47 is movable between an inner or first position adjacent the second end 2.25 of the support member 2.19 as shown in broken lines in FIG. 6 and an outer or second position spaced outwardly from the second end 2.25 of the support member 2.19 as shown in solid lines in FIG. 6. Each auxiliary support means 2.45, 2.47 is preferably vertically adjustable to allow the distance the workpiece 2.17 is supported above the top surface 2 21 to be varied as will now be apparent those skilled in the art. Each support means 2.45, 2.47 preferably includes roller means 2.51 for rollably supporting the workpiece 2 17. Each roller means 2.51 preferably includes an axle 2.53 from which a pair of spaced apart leg members 2.5B, 2.57 extend. Each support means 2.45, 2.47 preferably includes a body member 2.59 having a pair of spaced apart apertures within which the leg members 2.55, 2.57 are slidably positioned. Screws 2.61 are preferably provided to lock the leg members 2 55, 2.57 in place on the respective body members 2.59 as will now be apparent to those skilled in the art.

The portable workbench 2.11 preferably includes leg means attached to the support member 2.19 for holding the support member 2.19 above the support surface 2.15. The leg means are foldable to allow the workbench to be easily moved and stored. The leg means preferably includes a pair of first leg members 2.65 pivotally attached to the support member 2.19 adjacent the first end 2.23 of the top surface 2.21 thereof and preferably includes a pair of second leg members 2.67 pivotally attached to the support member 2.19 adjacent the second end 2.25 of the top surface 2.21 thereof. A first axle 2.69 preferably extends across the first end of the support member 2 19 between the first and second side rails 2.27, 2.3! adjacent the cutouts 2.33 and the first leg members 2.65 are pivotally attached to opposite ends thereof. Likewise, a second axle 2.71 preferably extends across the second end of the support member 2.19 between the first and second side rails 2.27, 2.29 adjacent the cutouts 2.33 and the second leg members 2.67 are pivotally attached to opposite ends thereof. With the leg members 2.65, 2.67 thus positioned, the outer edge of the cutouts 2.33 will act as a stop for the leg members 2.65, 2.67 in the open position as shown in FIG. 8 and as will now be apparent to those skilled in the art.

The portable workbench 2.11 preferably includes first rail means for slidably attaching the first auxiliary support means 2.45 to the support member 2.19, and preferably includes second rail means for slidably attaching the second auxiliary support means 2.47 to the support member 2.19. The first rail means preferably includes spaced apart first and second rail members 2.73, 2.75. Each rail member 2.73, 2.75 has a first end 2.77 attached to the body 2.59 of the first auxiliary support means 2.45 and has a second end 2.79. Likewise, the second rail means preferably includes spaced apart first and second rail members 2.81, 2.83. Each rail member 2 81, 2.83 has a first end 2.85 attached to the body 2.59 of the second auxiliary support means 2.47 and has a second end 2.87. The first and second rail members 2.73, 2.75 of the first rail means are preferably spaced from and preferably overlap the first and second rail members 2.81, 2.83 of the second rail means as clearly shown in FIGS. 7 and 10-12. The first ends 2.77, 2.85 of the respective rail members 2.73, 2.75, 2.81, 2.83 are preferably pivotally attached to the body 2.59 of the respective auxiliary support means 2.45, 2.47 to allow the auxiliary support means 2.45, 2.47 to pivot between an in-use position as shown in FIGS. 1 and 8 and a stored position as shown in FIGS. 9 and 13.

The portable workbench 2.11 includes guide means for guiding the first and second auxiliary support means 2.45, 2.47 between the first and second positions. The guide means preferably includes a guide block 2.89 mounted to the support member 2.19 beneath the top surface 2.21 thereof. The guide block 2.89 has a first guide aperture 2.91 therethrough for slidably receiving the first rail member 2.73 of the first rail means, a second guide aperture 2.93 therethrough for slidably receiving the second rail member 2.75 of the first rail means, a third guide aperture 2.94 therethrough for slidably receiving the first rail member 2.81 of the second rail means, and a fourth guide aperture 2.97 therethrough for slidably receiving the second rail member 2.83 of the second rail means (see FIGS. 7 and 11). The guide block 2.89 may be constructed out of nylon or the like in any manner now apparent to those skilled in the art and fixedly attached to the support member 2.19 beneath the top surface 2.21 and between the side rails 2.27, 2.29 as shown in FIGS. 7 and 11. Stop means are preferably provided for preventing the rail members 2.73, 2.75, 2.81, 2.83 from being removed from the guide block 2.89. The stop means preferably consists of a tab 2.98 fixedly attached to the distal end of each rail member 2.73, 2.75, 2.81, 2.83 for contacting the side of the guide block 2.89 adjacent the respective guide aperture 2.91-2.97 (see FIG. 7) to prevent the respective rail member 2.73, 2.75, 2.81, 2.83 from being pulled completely through the guide block 2.89 as will now be apparent to those skilled in the art. The guide means preferably includes a first guide bar mounted to the support member 2.19 beneath the top surface 2.21 thereof adjacent the first end 2.23 thereof for supporting the rail members 2.73, 2.75 and a second guide bar mounted to the support member 2.19 beneath the top surface 2.21 thereof adjacent the second end 2.25 thereof for supporting the rail members 2.81, 2.83. More specifically, the axles 2.69, 2.71 preferably act as the first and second guide bars, respectively. Thus, the axles 2.69, 2.71 are preferably located so that the rail members 2.73, 2.75, 2.81, 2.83 will slide back and forth on top thereof between the first and second positions as shown in FIGS. 8, 9, 10 and 12. The first guide bar (i.e., the first axle 2.69) preferably includes first flange means 2.99 for engaging the first rail member 2.73 and preferably includes second flange means 2.101 for engaging the second rail member 2.75 (see, in general, FIG. 10). The second guide bar (i.e., the second axle 2.71) also preferably includes first flange means 2.103 for engaging the first rail member 2.81 and preferably includes second flange means 2.105 for engaging the second rail member 2.83 (see, in general, FIG. 12). Each flange means 2.99-2.105 preferably consists of a pair of spaced apart flanges fixedly attached to the respective axle 2.69, 2.71 as will now be apparent to those skilled in the art.

Although the present invention has been described and illustrated with respect to preferred embodiments and a preferred use therefor, it is not to be so limited since modifications and changes can be made therein which are within the full intended scope of the invention.

We claim:

1. A portable workbench for supporting a power tool above a support surface as said power tool performs a power operation on a workpiece, said workpiece having a first end and a second end; said workpiece having a first end and a second end; said workbench comprising:

a) a support member including a top surface having a first end and a second end;

b) a first auxiliary support means for supporting said first end of said workpiece above said top surface of said support member; said first auxiliary support means being movable between a first position adjacent said first end of said support member and a second position spaced outwardly from said first end of said support member;

c) a second auxiliary support means for supporting said second end of said workpiece above said top surface of said support member; said second auxiliary support means being movable between a first position adjacent said second end of said support member and a second position spaced outwardly from said second end of said support member;

d) guide means for guiding said first and second auxiliary support means between said first and second positions;

e) securing means for securing said power tool to said support member, said securing means being adjustable relative to said top surface of said support member for allowing the location of said power tool between said first and second ends of said top surface to be adjusted; and f) first rail means for slidably attaching said first auxiliary support means to said support member, said first rail means including spaced apart first and second rail members, each of said rail members of said first rail means including a first end attached to said first auxiliary support means and a second end.

2. The portable workbench of claim 1 in which is included second rail means for slidably attaching said second auxiliary support means to said support member, said second rail means including spaced apart first and second rail members, each of said rail members of said second rail means including a first end attached to said second auxiliary support means and a second end.

3. The portable workbench of claim 2 in which said first and second rail members of said first rail means are spaced from and overlap said first and second rail members of said second rail means.

4. The portable workbench of claim 3 in which said guide means includes a guide block mounted to said support member beneath said top surface thereof; said guide block having a first guide aperture therethrough for slidably receiving said first rail member of said first rail means, having a second guide aperture therethrough for slidably receiving said second rail member of said first rail means, having a third guide aperture therethrough for slidably receiving said first rail member of said second rail means, and having a fourth guide aperture therethrough for slidably receiving said second rail member of said second rail means.

5. The portable workbench of claim 4 in which said guide means includes a first guide bar mounted to said support member beneath said top surface thereof adjacent said first end thereof for supporting said first and second rail members of said first rail means.

6. The portable workbench of claim 5 in which said guide means includes a second guide bar mounted to said support member beneath said top surface thereof adjacent said second end thereof for supporting said first and second rail members of said second rail means.

7. The portable workbench of claim 6 in which said first guide bar includes first flange means for engaging said first rail member of said first rail means and includes second flange means for engaging said second rail member of said first rail means; and in which said second guide bar includes first flange means for engaging said first rail member of said second rail means and includes second flange means for engaging said second rail member of said second rail means.

8. The portable workbench of claim 7 in which is included stop means for preventing said rail members from being removed from said guide block.

9. The portable workbench of claim 8 in which said auxiliary support means are vertically adjustable.

10. The portable workbench of claim 9 in which each of said auxiliary support means includes roller means for rollably supporting said workpiece.

11. The portable workbench of claim 10 in which said top surface of said support member has an elongated groove therein and in which is included attachment means slidably positioned within said groove in said top surface of said support member for slidably attaching said securing means to said support member.

12. The portable workbench of claim 11 in which said attachment means includes a plurality of bolt means slidably positioned with said groove, and in which said securing means includes a plurality of body members, each of said body members being slidably secured to said top surface of said support member by at least one of said bolt means.

13. The portable workbench of claim 7 in which is included leg means attached to said support member for holding said support member above said support surface.

14. The portable workbench of claim 13 in which said leg means are foldable to allow said workbench to be easily moved.

15. The portable workbench of claim 14 in which said leg means includes a pair of first leg members pivotally attached to said first guide bar and includes a pair of second leg members pivotally attached to said second guide bar.

16. A portable workbench for supporting a power tool above a support surface as said power tool performs a power operation on a workpiece, said workpiece having a first end and a second end; said workbench comprising:

a) a support member including a top surface having a first end and a second end;

b) a first auxiliary support means for supporting said first end of said workpiece above said top surface of said support member; said first auxiliary support means being movable between a first position adjacent said first end of said support member and a second position spaced outwardly from said first end of said support member;

c) a second auxiliary support means for supporting said second end of said workpiece above said top surface of said support member; said second auxiliary support means being movable between a first position adjacent said second end of said support member and a second position spaced outwardly from said second end of said support member;

d) securing means for securing said power tool to said support member, said securing means being adjustable relative to said top surface of said support member for allowing the location of said power tool between said first and second ends of said top surface to be adjusted;

e) first rail means for slidably attaching said first auxiliary support means to said support member, said first rail means including spaced apart first and second rail members, each of said rail members of said first rail means including a first end attached to said first auxiliary support means and a second end;

f) second rail means for slidably attaching said second auxiliary support means to said support member, said second rail means including spaced apart first and second rail members, each of said rail members of said second rail means including a first end attached to said second auxiliary support means and a second end; said first and second rail members of said first rail means being spaced from and overlapping said first and second rail members of said second rail means; and g) guide means for guiding said first and second auxiliary support means between said first and second positions; said guide means including a guide block mounted to said support member beneath said top surface thereof; said guide block having a first guide aperture therethrough for slidably receiving said first rail member of said first rail means, having a second guide aperture therethrough for slidably receiving said second rail member of said first rail means, having a third guide aperture therethrough for slidably receiving said first rail member of said second rail means, and having a fourth guide aperture therethrough for slidably receiving said second rail member of said second rail means; said guide means including a first guide bar mounted to said support member beneath said top surface thereof adjacent said first end thereof for supporting said first and second rail members of said first rail means; said guide means including a second guide bar mounted to said support member beneath said top surface thereof adjacent said second end thereof for supporting said first and second rail members of said second rail means.

17. The portable workbench of claim 16 in which said first guide bar includes first flange means for engaging said first rail member of said first rail means and includes second flange means for engaging said second rail member of said first rail means; and in which said second guide bar includes first flange means for engaging said first rail member of said second rail means and includes second flange means for engaging said second rail member of said second rail means.

18. The portable workbench of claim 17 in which is included atop means for preventing said rail members from being removed from said guide block.

* * * * *